United States Patent [19]
Fujio et al.

[11] Patent Number: 5,759,337
[45] Date of Patent: Jun. 2, 1998

[54] CONTAINER WITH A LABEL THEREON, AND APPARATUS AND METHOD FOR MANUFACTURING THE SAME

[75] Inventors: Masaaki Fujio; Hisataka Takada; Tadaaki Sugihara, all of Osaka, Japan

[73] Assignee: Fuji Seal, Inc., Osaka, Japan

[21] Appl. No.: 799,279

[22] Filed: Feb. 13, 1997

Related U.S. Application Data

[62] Division of Ser. No. 491,829, Jun. 19, 1995, abandoned.

[30] Foreign Application Priority Data

Jun. 21, 1994 [JP] Japan ................................. 6-138957

[51] Int. Cl.$^6$ ....................................................... B32B 31/00
[52] U.S. Cl. .......................... 156/443; 156/466; 156/356; 156/578; 53/552
[58] Field of Search ................... 156/218, 86, DIG. 51, 156/443, 466, 294, 423, DIG. 6, 356, 578; 53/550, 551, 552

[56] References Cited

U.S. PATENT DOCUMENTS

| | | | |
|---|---|---|---|
| 2,187,559 | 1/1940 | Levy et al. | 40/310 X |
| 2,587,422 | 2/1952 | Wills | 156/466 X |
| 2,914,108 | 11/1959 | Coakley | 156/466 X |
| 3,542,229 | 11/1970 | Beyerlein et al. | 40/310 X |
| 3,597,292 | 8/1971 | Takeda | 156/466 X |
| 3,604,584 | 9/1971 | Shank, Jr. | 40/310 X |
| 4,016,704 | 4/1977 | Fujio | 156/466 X |
| 4,183,441 | 1/1980 | Erlandson | 40/310 X |
| 4,412,876 | 11/1983 | Lerner et al. | 156/86 X |
| 4,519,186 | 5/1985 | Winter et al. | 156/86 X |
| 5,417,794 | 5/1995 | Menayan | 156/86 X |
| 5,524,778 | 6/1996 | De Caluwe et al. | 40/310 X |

Primary Examiner—James Engel
Attorney, Agent, or Firm—Jordan and Hamburg

[57] ABSTRACT

A continuous web of a preprinted heat shrinkable film with a heat sensitive adhesive on one surface thereof is wound around an outer periphery of a core member in such a manner as to overlap opposite longitudinal edges of the film to one another and form a continuous tubular label with the heat sensitive adhesive applied surface inwardly facing. A predetermined length of the continuous tubular label is cut into individual tubular labels, as the continuous tubular label is drawn downstream. The individual tubular label is applied over a container having a portion of a gradually decreasing cross section, from a portion of a smaller cross section of the container. The individual tubular label applied over the container is heated. Thereby, the individual tublar label is shrinked into intimate contact with the container with its portion of a larger cross section being bonded to the individual tubular label via the heat sensitive adhesive applied to the inwardly facing surface.

13 Claims, 7 Drawing Sheets

CONTAINER WITH A LABEL THEREON, AND APPARATUS AND METHOD FOR MANUFACTURING THE SAME

This application is a division of application Ser. No. 08/491,829 filed Jun. 19, 1995, now abandoned.

BACKGROUND OF THE INVENTION

This invention relates to a container with a label thereon, and an apparatus and method for manufacturing the same, and is more particularly related to a container having a portion of a gradually decreasing cross section and a tubular label fitted to the container, and an apparatus and method for forming the container.

In the following description, the term "tube (or tubular)" is used to refer to an elongated hollow body.

Conventionally, a container such as a bottle, can or the like, having a portion of a gradually decreasing cross section, is covered with a heat shrinkable plastic film which is previously formed into a tubular shape. The tubular film, (hereinafter referred to a tubular label) displays a trade mark, letters, ornamental designs and the like, as a label. The tubular label is formed by overlapping and sealing opposite longitudinal edges of a continuous web of the film together, and wound around a roll for storage, where the tubular label is flattened around the roll. When the tubular label is applied over the container, the tubular label is cut into individual tubular labels, each having a predetermined length, as the tubular label is unwound from the roll. Then, an unsealed end of the tubular label is opened by pulling the same outwardly via vacuum, and the tubular label is applied over the container from the opening end.

However, once the tubular label is flattened around the roll prior to being applied over the container, the folded edges are crimped or formed into a continuous crease. The continuous crease remains along the folded edges of the tubular label, after the tubular label is unwound from the roll. As a result, it is likely to invite distortion of the displaying information, and wrinkling at the folded portion of the tubular label.

In addition, since the container has a portion of a gradually decreasing cross section, when the tubular label is shrinked by heat shrinking process, the tubular label is likely to slip towards a portion of a smaller cross section. Further, since the continuous crease remains along the folded edges, and the tubular label has a tendency to come back to an original flattened shape, it is necessary to prepare the tubular label of a larger diameter than that of the container to facilitate application of the tubular label over the container. Accordingly, it is difficult to properly position the tubular label relating to the container before the tubular label is applied over the container. Consequently, the tubular label may be slipped towards an undesirable portion of the container.

To avoid the slippage of the film, it is conceivable that a heat sensitive adhesive is applied to an inner surface of the tubular label. However, this arrangement is disadvantageous, since blocking may occur between contacting surfaces of the label via the heat sensitive adhesive, when the tubular label is folded into a flat shape for storage. This hesitates the tubular label from being easily opened during the application process. Accordingly, it is difficult to apply a sufficient amount of the adhesive to the tubular label.

An object of the present invention is to provide an apparatus and method for applying a label over a container, while avoiding any crease on the label, and wrinking or distortion of an ornamental design or the like displayed on the label due to the crease, and easily and properly positioning the label to the container without slippage of the label to an undesirable portion of the container.

Another object of the present invention is to provide a container with a label thereon, the label being applied to the container without wrinkling or distortion of an ornamental design or the like displayed on the label.

SUMMARY OF THE INVENTION

In accordance with the above objects, the method of the present invention includes steps of winding a continuous web of a preprinted heat shrinkable film with a heat sensitive adhesive on one surface thereof around an outer periphery of a core member in such a manner as to overlap opposite longitudinal edges of the film to one another and form a continuous tubular label with the heat sensitive adhesive applied surface inwardly facing, cutting a predetermined length of the continuous tubular label into individual tubular labels, as the continuous tubular label is drawn downstream, applying the individual tubular label over a container having a portion of a gradually decreasing cross section, from a portion of a smaller cross section of the container, and heating the individual tubular label applied over the container to cause the label to heat-shrink into intimate contact with the container with its portion of a larger cross section being bonded to the individual tubular label via the heat sensitive adhesive applied to the inwardly facing surface.

There is further provided the apparatus for manufacturing a container with a label includes means for winding a continuous web of a preprinted heat shrinkable film with a heat sensitive adhesive on one surface thereof around an outer periphery of a core member in such a manner as to overlap opposite longitudinal edges of the film to one another and form a continuous tubular label with the heat sensitive adhesive applied surface inwardly facing, means for cutting a predetermined length of the continuous tubular label into individual tubular labels, as the continuous tubular label is drawn downstream, and applied over a container having a portion of a gradually decreasing cross section, from a portion of a smaller cross section of the container, and means for heating the individual tubular label applied over the container to cause the label to heat-shrink into intimate contact with the container with its portion of a larger cross section being bonded to the individual tubular label via the heat sensitive adhesive applied to the inwardly facing surface.

In the above method, the opposite longitudinal edges of the heat shrinkable film are overlapped to one another, and subsequently cut into the tubular label by the cutting means. Therefore, it is unnecessary to flatten the tubular label when winding the same around the roll prior to the application process. After applied over the container, the label is heated and subseqently shrinked. During shrinkage, an one end of the label intimately contacts the portion of a larger cross section, and the heat sensitive adhesive on the label is activated by heat, enabling the label to be bonded to the container. In this state, the label tends to slip towards a portion of a smaller cross section of the container due to the further shrinkage of the label. However, since the label is bonded at its one end to the container, the slippage can be effectively avoided. Thus, the label can be properly and intimately applied over the container via the heat sensitive adhesive. Another advantage associated with this method resides in the fact that, since the label need not be folded, a crease is unlikely to be formed, resulting in easy application of the label.

3

The above, and other objects, features and advantages of the present invention will become apparent from the detailed description thereof read in conjunction with the accompanying drawings.

DETAILED DESCRIPTION OF THE PREFERRED EMBODIMENTS

Figure 1:
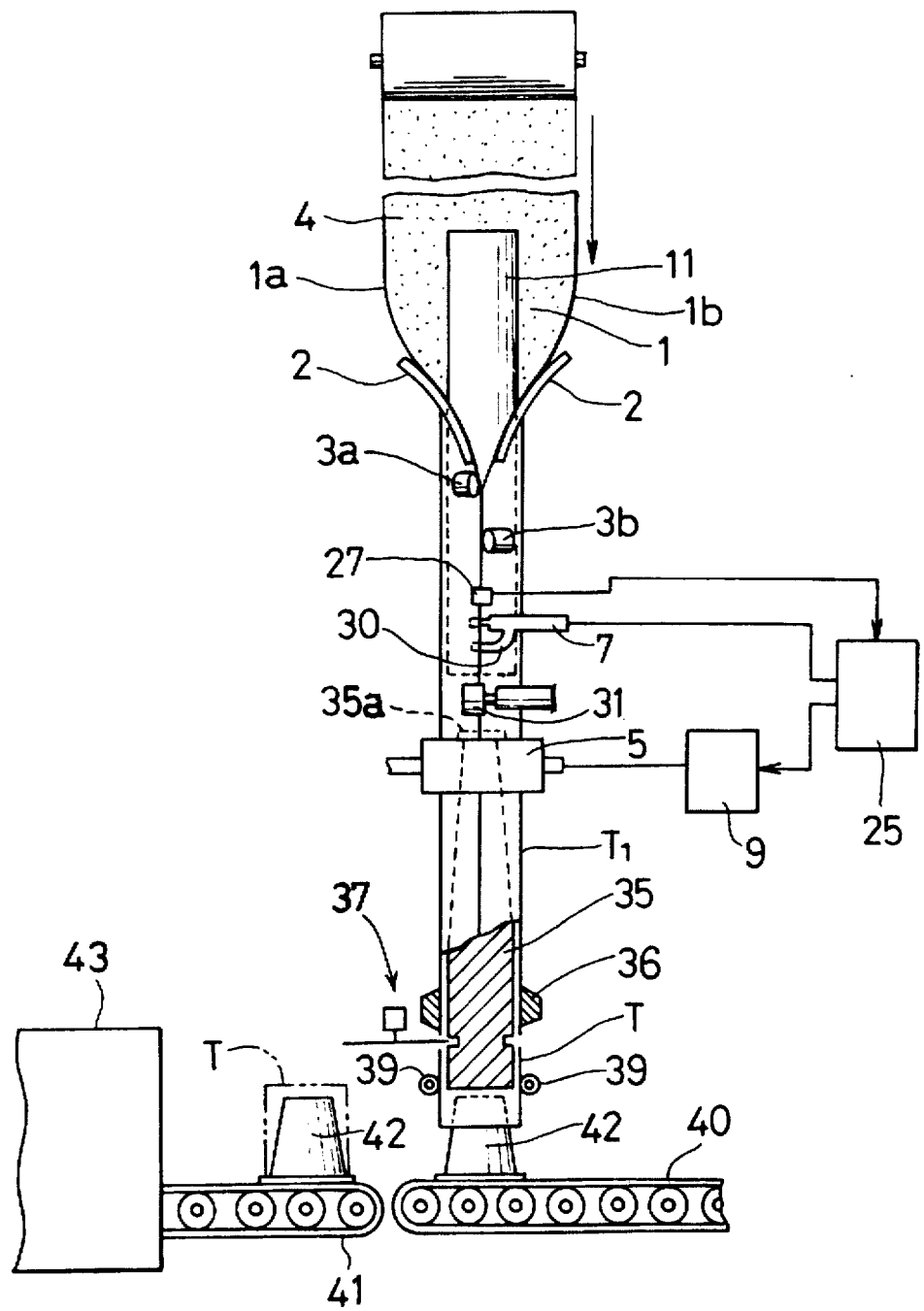
FIG. 1 is an elevational view with a partially cross section illustrating one embodiment of the present invention.

Referring to FIG. 1, a continuous web of a heat shrinkable film 1 is wound around a roll. Letters, ornamental designs and the like are printed on one surface of the film 1. In a rolled state, the film 1 is provided on an entire area of an inwardly facing surface thereof with a hot melt adhesive 4 as a heat sensitive adhesive which is capable of being activated when heated. The heat shrinkable film 1 may be made of known materials, such as polyester, polyvinyl chloride, polystyrene, polypropylene and polyethylene. It is preferable that the film 1 is shrinkable in the lateral direction thereof by 20% or more.

The film 1 is guided to a core member 11 made of a flat plate by a pair of guiding members 2, as a winding means, in such a manner as to be wound around an outer periphery of the core member 11. Thereby, opposite longitudinal edges of the film 1 are overlapped to one another such that the film 1 is formed into a tubular shape. A pair of guide rollers 3a and 3b press the film 1, the former pressing an edge 1a which is positioned outside of an edge 1b in an overlapped state, the latter pressing the edge 1b. A pair of intermittently feeding rollers 5 clamp and feed the film 1 in a flattened state downstream of the apparatus. An intermittently feeding mechanism 9 controls the intermittently feeding rollers 5 to feed a predetermined length of the film 1 downstream at each feeding process.

4

Figure 2:
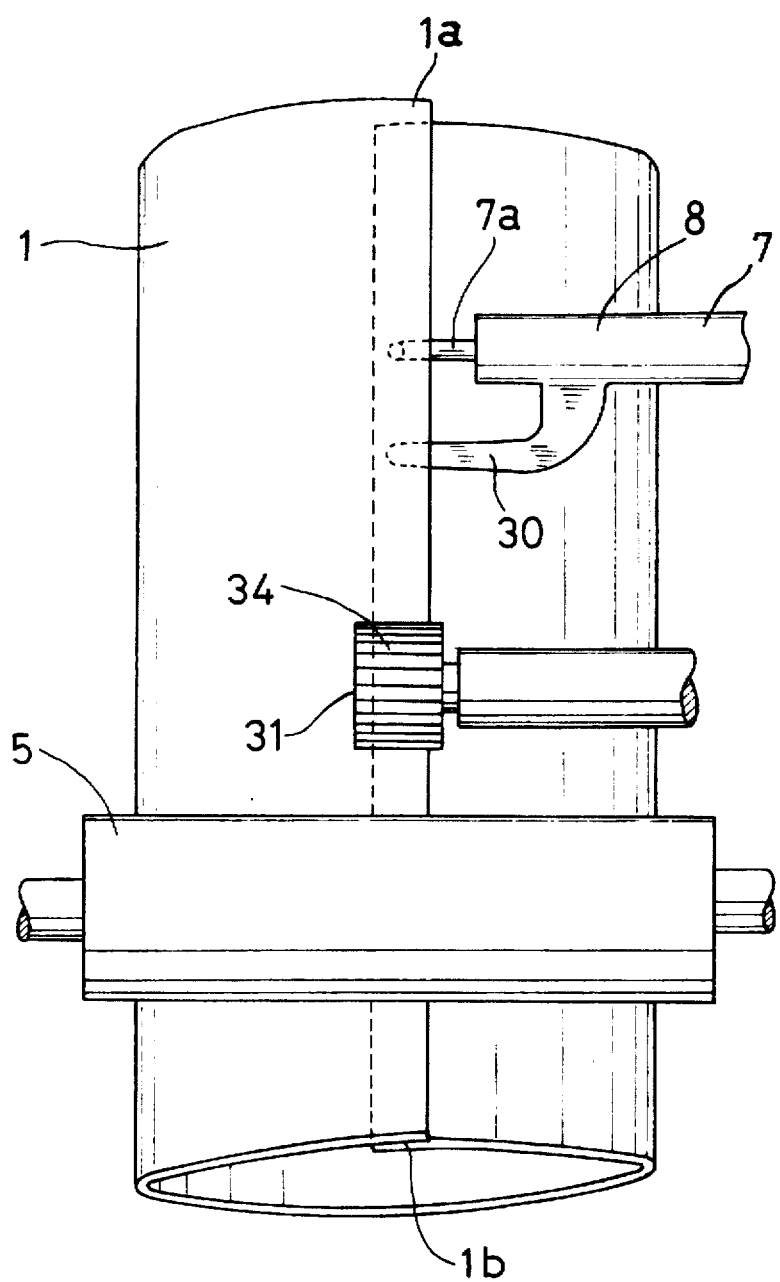
FIG. 2 is an elevational view of an essential portion of FIG. 1.
Figure 3:
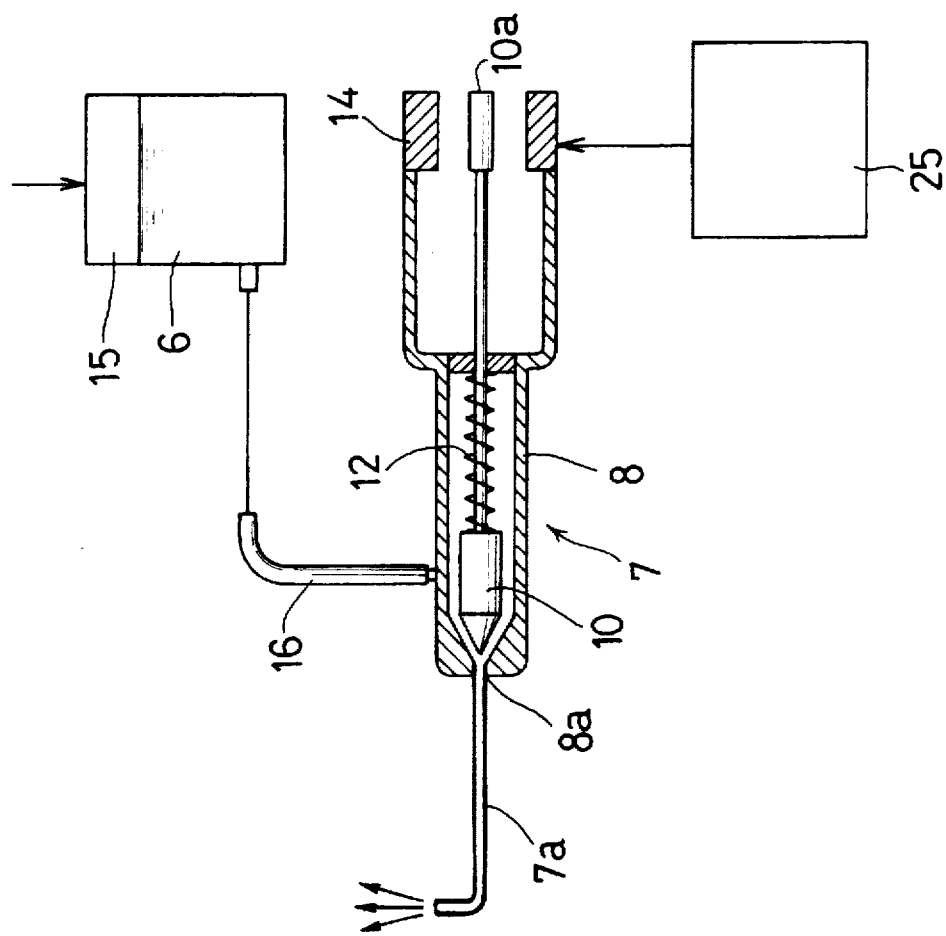
FIG. 3 is a schematic cross section illustrating a nozzle of FIG. 1.

A nozzle 7 is disposed between the guide roller 3b and the intermittently feeding rollers 5 so as to discharge solvent 6 as a bonding agent therethrough to an inwardly facing surface of the edge 1a of the film 1. Referring to FIGS. 2 and 3, the nozzle 7 includes a nozzle body 8, a discharge opening 8a formed in the nozzle body 8, and a needle valve 10 which is movable for releasably closing the discharge opening 8a. The needle valve 10 is urged against the discharge opening 8a by a spring 12 to generally close the same. When annular electromagnets 14, which is positioned at an end of the nozzle body 8, is magnetized, the electromagnets 14 attracts an attracted portion 10a of the needle valve 10 to move the needle valve 10 towards electromagnets 14 and away from the discharge opening 8a. Thereby, the discharge opening 8a opens, forcing against the spring force of the spring 12.

A tank 15 is filled with the solvent 6 and communicated with the nozzle body 8 via a hose 16. The solvent 6 can be discharged from the nozzle port 7a by introducing compressed air into the tank 15. A tip portion of the nozzle port 7a is bent in such a direction to be perpendicular to the outside edge 1a of the film 1.

A spreading member 30 is integrally mounted to the nozzle body 8 and is positioned downstream of the nozzle port 7a. The spreading member 30 slightly contacts the outside edge 1a of the film 1 and spreads the solvent applied to the edge 1a. The position of the outside edge 1a is determined in accordance with the position of the spreading member 30, and the position of the inside edge 1b is determined by pressing the edge 1b with the guide roller 3b such that a clearance L is defined between the overlapped longitudinal edges 1a and 1b. The nozzle port 7a is introduced into the clearance L in such a manner as to be spaced apart from the outside edge 1a.

Figure 5A:
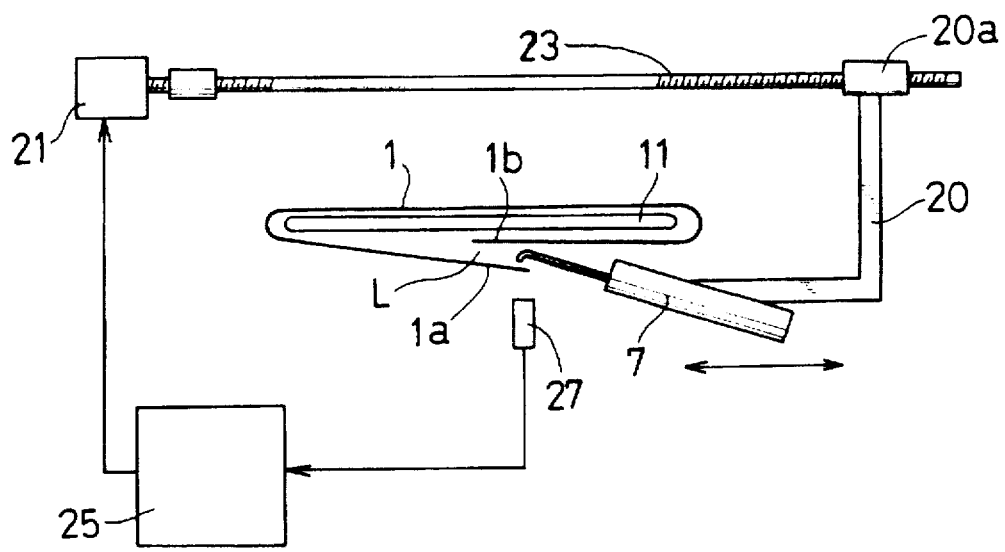
FIG. 5A is a schematic plan view illustrating a control system of the nozzle.

The electromagnets 14 of the nozzle 7 is connected with a control unit 25 to timely discharge the solvent 6 from the nozzle 7 in association with the intermittently feeding mechanism 9. This associated operation is carried out such that the intermittently feeding mechanism 9 and the nozzle 7 can be driven in synchronism, or with time lag. Referring to FIG. 5A, a L-shaped arm 20 is provided at its tip portion with the nozzle 7, and at its base portion with a nut member 20a which is threadedly connected with a feed screw 23 which is rotatable in both directions by a servomotor 21. The servomotor 21 is, in turn, connected with the control unit 25.

A sensor 27, for example, an image sensor, photoelectric cell and camera, is positioned adjacent to the nozzle 7 in the upstream side thereof, and connected with the control unit 25 to detect the longitudinal edges 1a and 1b of the film 1. Accordingly, the control unit 25 controls the servomotor 21 in accordance with the information transmitted from the sensor to properly rotate the feed screw 23, enabling the nozzle port 7a to follow the edges 1a and 1b of the film 1, even if the edges 1a and 1b deviate from a predetermined feeding line, that is, moves in a zigzag direction.

Figure 4:
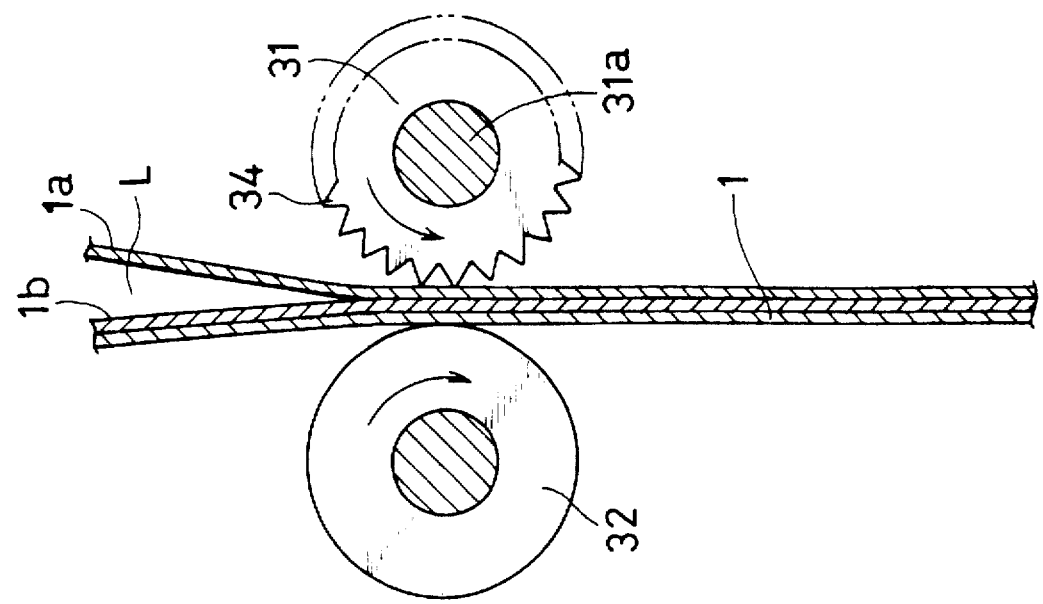
FIG. 4 is a cross section illustrating a pair of pressing rollers in a state that they press opposite longitudinal edges of a film.

A pair of pressing rollers 31 and 32 are disposed between the nozzle 7 and the intermittently feeding roller 5 to form a continuous tubular label T1 by pressing and bonding the overlapped longitudinal edges 1a and 1b of the film 1. The pressing roller 31 is provided thereon with protrusions 31 extending in the axial direction of a supporting axis 31a, as illustrated in FIG. 4.

Referring back to FIG. 1, a label opening member 35 is positioned inside of the continuous label T1, and movably suspended from the pair of the intermittently feeding rollers 5 at an upper buldging portion 35a. A lower portion of the label opening member 35 is of a round cross section, around of which an annular cutting groove is formed in its circumferential direction.

A label fixing jig 36 is positioned at a terminal end of the continuous label T1 to fix the label T1 in position in cooperation with the label opening member 35 to avoid undesirable deviation in a cutting process. The label fixing jig 36 may be in the form of a collet chuck of a three-point tightening type being contactable and expandable by air pressure. A disk-shaped label cutter, which is rotatable about its axis, is circularly movable around the continuous label T1 along the annular cutting groove of the label opening member 35. Rollers 39 feed an individual label T cut from the continuous label T1 downstream.

Container transport mechanisms 40 and 41, each comprising a belt conveyor, intermittently or successively transport containers 42 to a position just under the film 1, in which the labels T are respectively applied over the containers 42. The containers, each having the label T are transported to a shrink mechanism 43 to apply the heat over the label T. Each container 42 is of a rounded or rectangular shape in plan, and has a bottom wall at its one end, and a side wall which gradually decreases in cross section towards the bottom wall.

In accordance with the apparatus of the above arrangement, the forming and application processes of the label will be described hereinafter.

The film 1 is fed downwardly along the guiding members 2 and the guide rollers 3a and 3b by the rotation of the intermittently feeding rollers 5 such that the opposite longitudinal edges 1a and 1b of the film 1 are overlapped to one another. In this state, the clearance L is defined between the overlapped longitudinal edges 1a and 1b by the spreading member 30 and the guide roller 3b. The nozzle port 7a of the nozzle 7 is introduced into the clearance L in such a manner as to be perpendicular to the edge 1a which is positioned over the opposite edge 1b, thereby effectively and securely discharging the bonding agent to the edge of the film 1. The compressed air is introduced into the tank 15 to supply the solvent 6 into the nozzle body 8, while the control unit 25 magnetize the electromagnet 14, enabling the needle valve 10 to move away from the discharge opening 8a. Accordingly, the solvent 6 is discharged from the nozzle port 19.

Figure 5B:
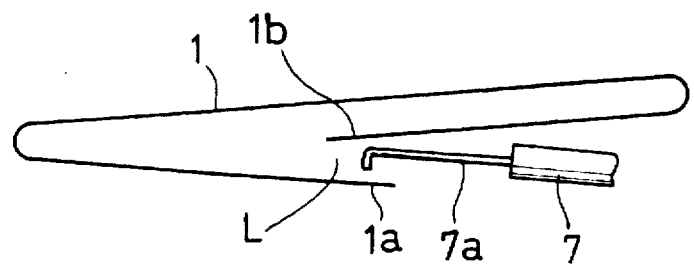
FIGS. 5B and 5C are schematic plan views illustrating moving states of the nozzle in accordance with positions of the longitudinal edges of the film.
Figure 5C:
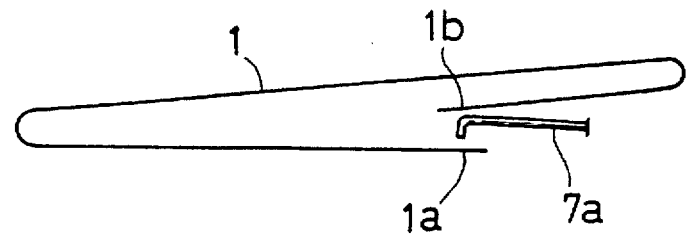
Figure 6:
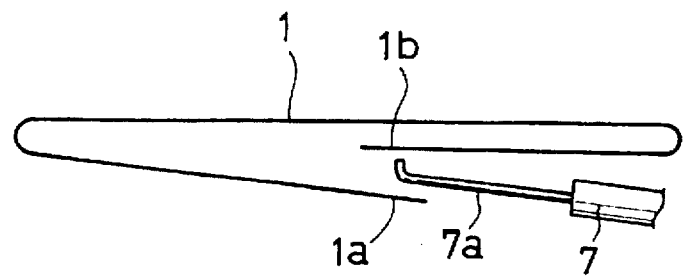
FIG. 6 is the nozzle of another embodiment of the present invention.

The sensor 27 detects the longitudinal edges 1a and 1b of the film 1 when the nozzle 7 descharges the solvent 6 to the film 1. Therefore, the detected information is transmitted to the control unit 25 which subsequently controls the servomotor 21. Thereby, if the longitudinal edges 1a and 1b move in a zigzag direction as illustrated in FIGS. 5B and 5C, the servomotor 21 rotates the feed screw 23, and moves the arm 20 along the feed screw 23. Thereby, the nozzle 7 follows the edges 1a and 1b such that the nozzle port 7a faces the edge 1a, keeping a predetermined distance therefrom. In this state, when the solvent 6 is discharged to the moving film 1, it is unlikely to invite an uneven application of the solvent 6 to the film 1, which may form an undesirable ridge of the solvent 6 on the film 1.

The spreading member 30 spreads and smoothens the solvent 6 discharged to the outside edge 1a of the film 1, and the pressing rollers 31 and 32 press the edges 1a and 1b together, securing the bonding state therebetween.

The thus formed continuous label T1 is fed downstream from a lower end of the label opening member 35, and is partially applied over the container with its bottom wall facing upward. In this regard, the container is transported to a stand-by position which is just below the continuous label T1. Then, the control unit 25 stops the intermittently feeding rollers 5 to stop feeding of the film 1, and simultaneously releases the electromagnet 14 of the nozzle 7 from the magnetized condition such that the spring 12 forces the needle valve 10 to the discharge opening 8a for closing the same. Thus, the nozzle 7 instantly stops discharging of the solvent 6. Since the space between the nozzle port 7a and the edge 1a of the film 1 is maintained in this state, it is unlikely that the solvent 6, which has been discharged and remains around the nozzle port 7a, sticks to the film 1 and undesirably melts the same. As a consequence, it is possible to properly and easily adjust the amount of the solvent 6 to be discharged.

Figure 7A:
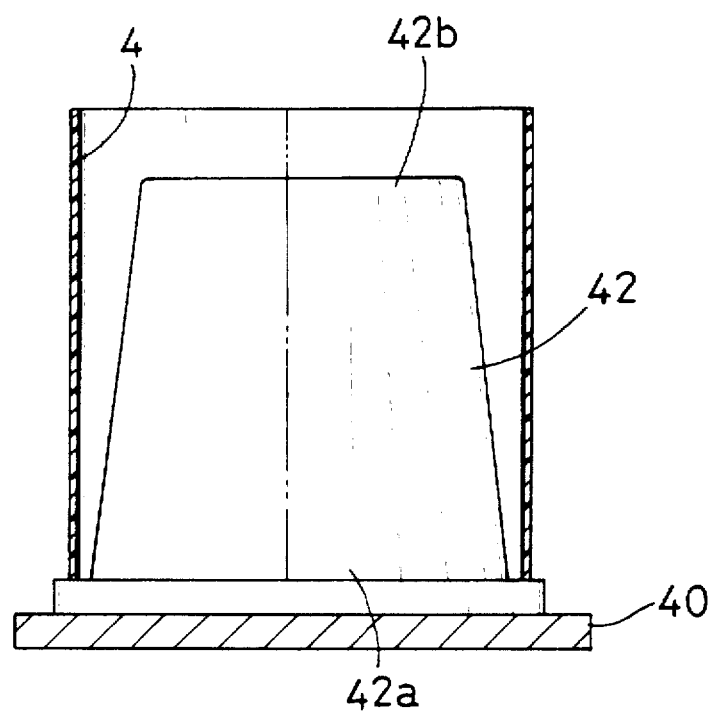
FIGS. 7A and 7B are elevational views in cross section illustrating shrinking states of the label.

Then, the label fixing jig 36 fixes the continuous label T1 in position by pressing a peripheral surface thereof, and then the cutter 37 moves along the annular cutting groove of the label opening member 35, and cut the continuous label T1 into the individual label T of a predetermined length. Then, the individual label is fed downstream by the rollers 39. The individual label T is placed over the container 42, as illustrated in FIG. 7A. In this regard, the rollers 39 may be omitted, since the individual label T falls downward to be applied over the container 42 by gravity.

Figure 7B:
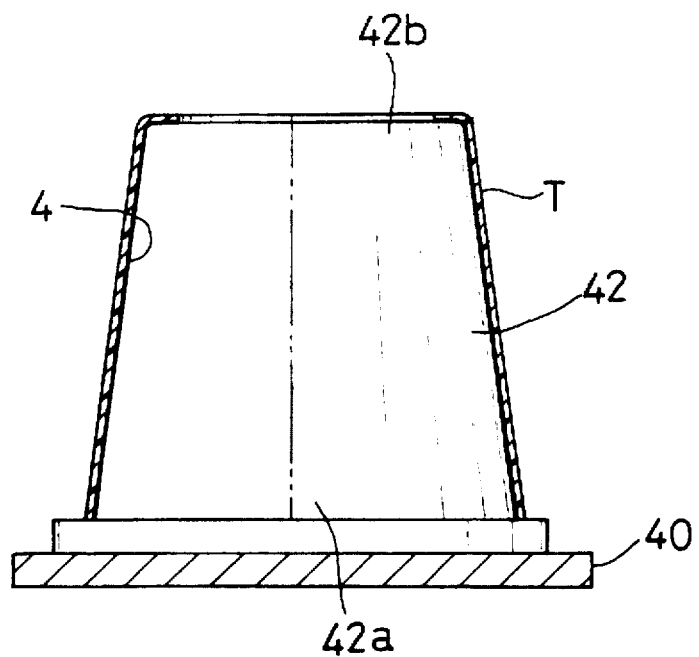

The container 42 with the label T thereon is transported to the shrink mechanism 43, in which the heat is applied over the individual label T. The individual label T is subsequently shrinked by the heat, and contacts at the lower end thereof a diametrally larger end 42a of the container 42. In this regard, the hot melt adhesive 4 is activated such that the lower end of the individual label T is bonded to the container 42. The shrinkage of the label T is further progressed. Therefore the label T entirely conforms around the peripheral surface of the container 42. During this shrinking process, the label T is unlikely to slip towards a diametrally smaller portion 42b, since the label T is bonded to the diametrally larger portion 42a of the container 42. As a result, the label T is maintained at a proper position of the container 42, as illustrated in FIG. 7B. In this regard, it is preferable to apply the heat to the lower end of the label T at first for more secured application of the label T.

Thus, the containers 42 are successively transported, while the individual labels T are formed and respectively applied over the containers 42.

With this arrangement, since the continuous cylindrical label T1 need not be wound around the roll in a flattened state, it is unlikely to cause creases or the like on the film. Accordingly, wrinkling of the label, the distortion of the displaying designs or the like can be effectively avoided. In addition, a series of the operations to make the label T from the continuous film 1, and apply the label T over the container 42, can be successively carried out.

Further, since the continuous label T1 need not be stored in a rolled state, the label T1 is unlikely to be deteriorated in quality in a relatively prolonged period of time, thus contributing to the easy storing and controlling of the label.

In this embodiment, the description, concerning the advantage effected by forming the spacing between the nozzle port 7a and the film 1, was made, particularly when the film 1 is temporarily stoped in the intermittent feeding. However, it is a matter of course that the solvent 6 is unlikely to melt the film 1, drop along the film, and protrude outwardly from the portion of the film 1 to be bonded, when the apparatus is out of operation for a predetermined period of time.

It is not necessary to limit the discharging direction of the solvent 6 to this embodiment. That is, the solvent 6 may be discharged to the edge 1b which is positioned inside of the edge 1a by directing the nozzle port 7a to the edge 1b. Further, the solvent 6 may be discharged to both edges 1a and 1b.

It is not necessary to limit means for bonding the longitudinal edges 1a and 1b together to the solvent 6. Instead, a bonding agent may be employed in this embodiment. The bonding agent is unlikely to melt the film 1, drop along the film 1 and protrude outwardly from the portion of the film 1 to be bonded.

Figure 8A:
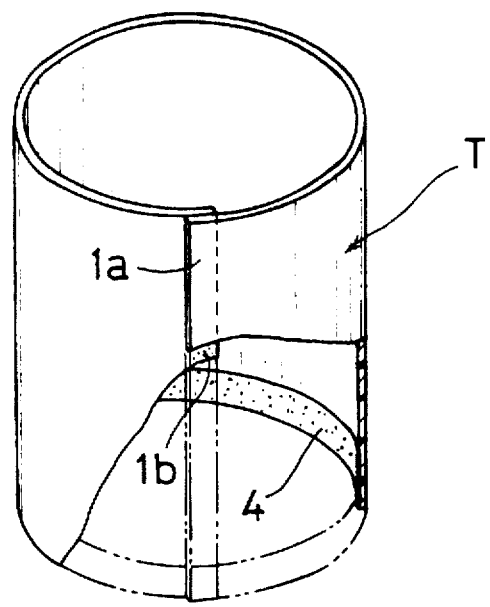
FIG. 8A is a perspective view with a broken-out section illustrating the label in accordance with the present invention.

In this embodiment, the heat sensitive adhesive 4 is entirely applied over the inwardly facing surface of the label T. However, the heat sensitive adhesive 4 may be partially applied to either end of the label T, the end corresponding to the diametrally larger portion 42a of the container 42, as illustrated in FIG. 8A. Accordingly, it is essential to apply the heat sensitive adhesive 4 to at least one end of the label T. In this regard, the residual area of the label T may optionally have the heat sensitive adhesive 4 thereon. In this case, since the label T need not be folded into a flat shape, it is possible to apply a sufficient amount of the heat sensitive adhesive 4 to the entire area of the inner surface of the film 1.

Figure 8B:
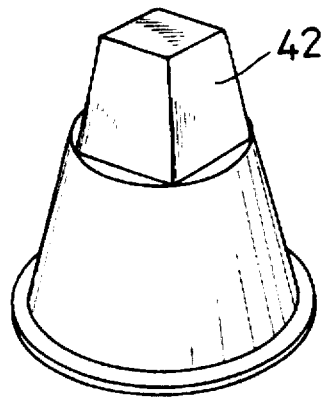
FIGS. 8B and 8C are perspective views illustrating the containers of other embodiments.
Figure 8C:
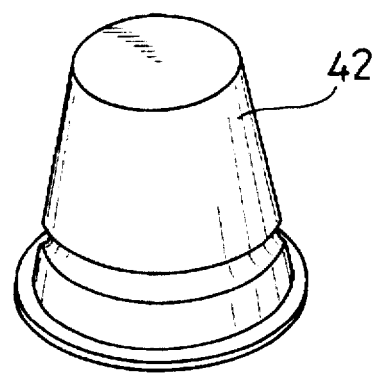

Referring to FIGS. 8B and 8C, the container 42 may be of a combination of rectangular and circular cross sections, and may include anular concave. Further, the container 42 may be in the form of a circular cone, circular truncated cone, pyramid, truncated pyramid or the like. In this regard, it is essential that the container 42 has a portion of a gradually decreasing cross section. Further, the container 42 may be formed from a synthetic resin material, glass, metal, etc.

Figure 9A:
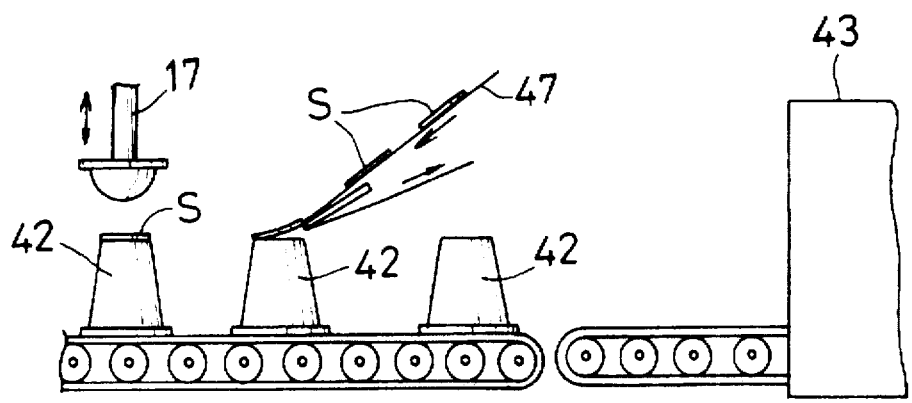
FIG. 9A is a schematic elevational view illustrating the application process of a tack label to the container.
Figure 9B:
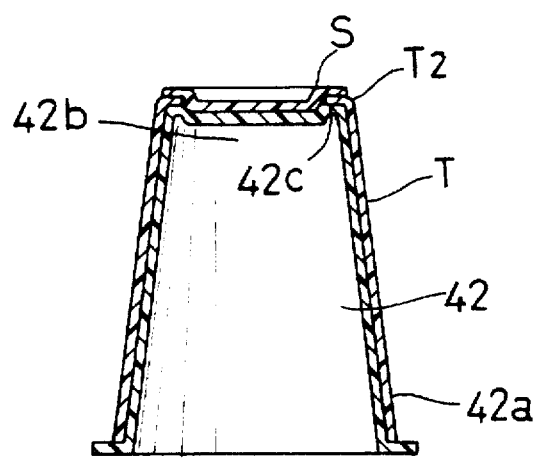
FIG. 9B is a cross section of the container with the tack label.

Referring to FIGS. 9A and 9B, a tack label S may be attached to the bottom surface of the container 42, after the container 42 passes through the shrink mechanism 43, to display information on a partial or entire area of the bottom surface. A label end T2, which is opposite to the end corresponding to the diametrally larger portion 42a of the container 42, is bent to conform around a bottom protrusion 42c extending along a peripheral edge of the bottom wall of the container 42. A belt conveyor 45 is disposed downstream of the shrink mechanism 43. A plurality of the tack labels S are attached to a release paper 47, and positioned above the containers 42 which are transferred by the belt conveyor 45. Then, the tack labels S are successively released from the release paper 47, and respectively attached to the containers 42, while the label end T2 is pressed towards the bottom surface of the container 42 with each tack label S.

In case the tack label S is made of a thermoplastic film, it is possible to bring the tack label S into intimate contact with the bottom surface of the container 42 by pressing the tack label S to the bottom surface from above with a label pressing member 17, which is previously heated. This arrangement effectively works if the bottom surface of the container 42 has a protruded portion, or other irregular configurations. It is also possible to employ a label with a heat sensitive adhesive thereon, instead of the tack label S.

Figure 10A:
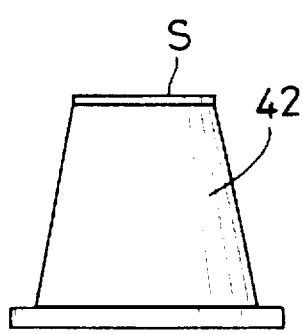
FIGS. 10A, 10B and 10C are elevational views with partially cross section illustrating application process of the label in accordance with a further embodiment of the present invention.
Figure 10B:
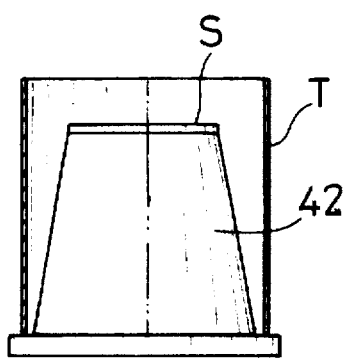
Figure 10C:
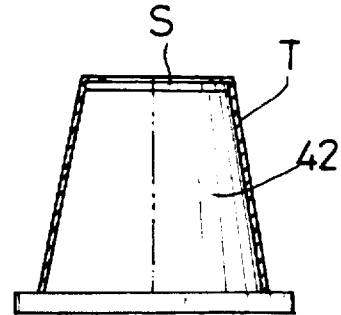

The tack label S may be placed on the bottom surface of the container 42 at first, as illustrated in FIG. 10A. Accordingly, the label T with the heat sensitive adhesive thereon is applied over the container 42 from above, and shrinked into intimate contact with the container by heat, while holding the tack label S therewith, as illustrated in FIGS. 10B and 10C.

The diametrally larger or smaller portions of the container 42 is not neccessarilly limited to a case, in which the container 42 is of a rounded cross section, but includes a case, in which the container 42 is of a varying cross section, such as an eliptical, rectangular cross section.

In case the film 1 is laminated with a material of polyvinylidene chloride, ethylene vinyl alcohol copolymer or the like, or laminated with aluminum via vapor deposition, the film 1 improves a gass barrier property of the container 42. When the hot melt adhesive 4 is applied to the both ends of the label T, and the tack label S is attached to the bottom surface of the container 42, as illustrated in FIGS. 9 and 10, the gas barrier property of the container 42 can be further improved.

In case the film 1 or ink applied thereto exhibits ultraviolet ray absorbing property, even if the container is made of a transparent material, harmful ultraviolet rays may be reduced or cut off with the film 1 or the ink such that contents inside of the container 42 can maintain its quality.

It is not essential to limit the heat sensitive adhesive to the hot melt adhesive, which is to be applied to the label T. It is possible to employ a delayed tack adhesive having such a property that it does not exhibit tackiness in a room temperature, but becomes tacky when heated, and maintains its tacky property for a prolonged period of time after cooling. Accordingly, various types of adhesive may be employed in the present application.

This specification is by no means intended to restrict the present invention to the preferred embodiments set forth therein. Various modifications to the container, method and apparatus of the present invention, as described herein, may be made by those skilled in the art without departing from the spirit and scope of the present invention as defined in the appended claims.

What is claimed is:

1. An apparatus for manufacturing a label and applying the label to a container, which comprises:

wrapping means for wrapping a continuous web of a preprinted heat shrinkable film with a heat sensitive adhesive on one surface thereof around an outer periphery of a core member to overlap opposite longitudinal edges of said heat shrinkable film to one another while preventing said one surface with said heat sensitive adhesive from adhering to itself and preventing crease formation in said heat shrinkable film to form a continuous tubular label with said one surface having said heat sensitive adhesive inwardly facing;

said wrapping means including a means for bonding said overlapped opposite longitudinal edges of said heat shrinkable film together;

means for cutting a predetermined length of said continuous tubular label into individual tubular labels while drawing said continuous tubular label downstream from said wrapping means and applying ones of said individual labels over a container having a portion having a gradually decreasing cross section; and means for heating and adhesively bonding said individual tubular labels applied over said container to cause said label to heat-shrink into intimate contact with said container such that a portion of said container having a larger cross section bonded to said individual tubular labels via said heat sensitive adhesive applied to said one surface.

2. An apparatus for manufacturing a label and applying the label to a container, which comprises:

wrapping means for wrapping a continuous web of a preprinted heat shrinkable film with a heat sensitive adhesive on one surface thereof around an outer periphery of a core member in such a manner as to overlap opposite longitudinal edges of said heat shrinkable film to one another;

a nozzle for discharging a bonding agent to at least one of said opposite longitudinal edges of said heat shrinkable film to bond said opposite longitudinal edges together to form a continuous tubular label;

feeding means for feeding said continuous tubular label downstream of said wrapping means;

means for cutting a predetermined length of said continuous tubular label into individual tubular labels while said continuous tubular label is fed downstream;

means for successively transporting containers, each of said containers having a portion having a gradually decreasing cross section, to a position whereat said individual tubular labels are respectively applied over said containers by said feeding means; and means for heating and adhesively bonding said individual tubular labels applied over said containers to heat-shrink said individual tubular labels into intimate contact with said containers with a portion of said containers having a larger cross section being bonded to said individual tubular labels via said heat sensitive adhesive.

3. The apparatus as set forth in claim 2, further comprising:

means for defining a clearance between said overlapped longitudinal edges of said heat shrinkable film wherein a nozzle port of said nozzle is inserted; and positioning means for spacing a tip portion of said nozzle port a predetermined distance from the one of said longitudinal edges of said heat shrinkable film to which said bonding agent is applied.

4. The apparatus as set forth in claim 3, wherein said nozzle port of said nozzle is bent in a direction perpendicular to said one of said longitudinal edges of said heat shrinkable film to which said bonding agent is applied.

5. The apparatus as set forth in claim 3, wherein said positioning means includes a sensor for detecting the one of said longitudinal edges of said heat shrinkable film, to which said bonding agent is applied, and means for moving said nozzle in a direction transverse to the feeding direction of said heat shrinkable film in accordance with detected information transmitted from said sensor to maintain said tip portion of said nozzle at said predetermined distance from the one of said longitudinal edges.

6. The apparatus as set forth in claim 3, further comprising means for spreading said bonding agent applied to said edge of said heat shrinkable film provided downstream of said nozzle port of said nozzle in such a manner as to abut against said edge.

7. The apparatus as set forth in claim 2, wherein:

said feeding means comprises a pair of feeding rollers for clamping and intermittently feeding said continuous tubular label; and control means for controlling said nozzle in conjunction with said feeding means to discharge said bonding agent during a moving state of said heat shrinkable film and to stop discharging of said bonding agent during a stopped state of said heat shrinkable film.

8. The apparatus as set forth in claim 7, wherein a pair of pressing rollers are provided between said nozzle and said feeding rollers to press said overlapped longitudinal edges of said heat shrinkable film together.

9. An apparatus for manufacturing a tubular label and applying the label to a container, which comprises:

wrapping means for wrapping a continuous web of a preprinted heat shrinkable film thereof around an outer periphery of a core member in such a manner as to overlap opposite longitudinal edges of said heat shrinkable film to one another;

a nozzle for discharging a bonding agent to at least one edge of said opposite longitudinal edges of said heat shrinkable film to bond said opposite longitudinal edges together to form a continuous tubular label;

feeding means for feeding said continuous tubular label downstream of said wrapping means;

means for cutting a predetermined length of said continuous tubular label into individual tubular labels while said continuous tubular label is fed downstream;

means for successively transporting containers, to a position whereat said individual tubular labels are respectively applied over said containers by said feeding means;

means for heating said individual tubular labels applied over said containers to heat-shrink said individual tubular labels into intimate contact with said containers;

means for defining a clearance between said overlapped longitudinal edges of said heat shrinkable film wherein a nozzle port of said nozzle is inserted;

positioning means for spacing a tip portion of said nozzle port a predetermined distance from the one of said longitudinal edges of said heat shrinkable film to which said bonding agent is applied; and said positioning means including a sensor for detecting the one edge of said longitudinal edges of said heat shrinkable film, to which said bonding agent is applied, and means for moving said nozzle in a direction transverse to the feeding direction of said heat shrinkable film in accordance with detected information transmitted from said sensor to maintain said tip portion of said nozzle at said predetermined distance from the one edge of said longitudinal edges.

10. The apparatus as set forth in claim 9, wherein said nozzle port of said nozzle is bent in a direction perpendicular to said one edge of said longitudinal edges of said heat shrinkable film to which said bonding agent is applied.

11. The apparatus as set forth in claim 9, further comprising means for spreading said bonding agent applied to said one edge of said heat shrinkable film provided downstream of said nozzle port of said nozzle in such a manner as to abut against said one edge.

12. The apparatus as set forth in claim 9, wherein:

said feeding means comprises a pair of feeding rollers for clamping and intermittently feeding said continuous tubular label; and control means for controlling said nozzle in conjunction with said feeding means to discharge said bonding agent during a moving state of said heat shrinkable film and to stop discharging of said bonding agent during a stopped state of said heat shrinkable film.

13. The apparatus as set forth in claim 12, wherein a pair of pressing rollers are provided between said nozzle and said feeding rollers to press said overlapped longitudinal edges of said heat shrinkable film together.

* * * * *